United States Patent [19]

Swarts et al.

[11] Patent Number: 4,714,815
[45] Date of Patent: Dec. 22, 1987

[54] DUAL LASER BEAM BRAZING OF FINE WIRES

[75] Inventors: Richard E. Swarts, Simsbury; E. Marston Moffatt, Glastonbury; Mario T. Lopiccolo, Southington, all of Conn.

[73] Assignee: United Technologies Corporation, Hartford, Conn.

[21] Appl. No.: 926,933

[22] Filed: Nov. 4, 1986

[51] Int. Cl.[4] ............................................. B23K 26/00
[52] U.S. Cl. ....................... 219/121 LC; 73/516 LM; 219/121 LD
[58] Field of Search ................. 219/121 LC, 121 LD, 219/121 LS, 121 LT, 121 EC, 121 ED, 121 LE, 121 LF; 73/516 LM

[56] References Cited

U.S. PATENT DOCUMENTS 3,463,898 8/1969 Takaoka et al. ......... 219/121 LT X
4,083,629 4/1978 Kocher et al. ........... 219/121 LT X

FOREIGN PATENT DOCUMENTS 0205675 11/1983 Japan ........................... 219/121 LT Primary Examiner—C. L. Albritton
Attorney, Agent, or Firm—Dominic J. Chiantera

[57] ABSTRACT

The sensor wires (16, 18) of an angular rate sensor (ARS) on sensor plug assembly (12) are mounted to their respective mounting posts (20–23) using dual laser beams (30, 32) spaced on opposite sides of the wire (16) so as to melt the post surface without direct heating of the wire.

11 Claims, 7 Drawing Figures

DUAL LASER BEAM BRAZING OF FINE WIRES

TECHNICAL FIELD

This invention relates to metallurgical bonding, and more particularly to metallurgical bonding of fine wires using dual laser beams.

BACKGROUND ART

In the fabrication of hot-wire angular rate sensors (ARS) of the type described in U.S. Pat. No. 4,020,700 to Lopiccolo et al, a critical step involves the bonding of the pair of temperature sensitive resistance wires to their mounting posts in the ARS sensor plug assembly. The wires are tungsten, and are less than filament size with a wire diameter on the order of 0.000200 inches (0.00051 cm). The mounting posts are typically KOVAR ® with a diameter on the order 0.020 inches (0.051 cm). The wires must be bonded in electrical contact to the exposed upper surface of the posts.

In the operation of the ARS each resistance wire is an active element in one leg of a balanced bridge. The wire mounted plug assembly is located at one end of a jet chamber housed in a fluid filled casing, and the wires are cooled differentially by a fluid jet in dependence on Coriolis deflection of the jet during angular rotation of the ARS. The resulting bridge imbalance produces a differential voltage signal whose magnitude is proportional to the angular velocity of the sensor. The absence of rotation (sensor null state) results in equal cooling of the wires and the differential output signal from the bridge is ideally zero.

The angular rate is expressed in volts/degree/second. In operation the ARS is used with a servo control system to reduce the angular rate to zero. The voltage output should be zero at this point but in practice there is always a small residual voltage which has to be calibrated for each individual sensor. The main object of the invention is to reduce this residual null voltage (null error) to the smallest possible amount as described below. This null error is critically dependent on the existence of balanced thermal conductivity through the sensor wires and mounting posts, and on the balanced geometric positioning of the wires from the jet stream centerline. In operation, the wires achieve operating temperatures approximately 200° F. above ambient. Heat transfer from the wires is primarily through convection cooling by the jet (approximately 80%), with 12–15% of the heat transfer provided by conduction through the mounting posts, and the balance through radiation. Relative offsets in positioning the wires from the jet centerline will cause unequal convective cooling. Imbalanced thermal conductivity (wire-to-post) will cause unequal conductive cooling. Either of these conditions result in null error.

To provide balanced conductivity the wires are resistance matched to achieve near zero differences. The mounting posts, due to their 100× larger diameter than the wires, are effectively balanced. However, thermal conductivity of the different wire-to-post bonds may not be balanced due to variations in bond integrity, inherent in the joining of fine diameter wires to the much larger surface area of the posts and to unequal effective wire lengths due to imprecise location of the weld spots. In the bonding process the wire cannot be directly heated since the wire will melt before the post surface with its relatively large thermal mass.

The prior art bonding techniques include the use of resistance brazing. The positive and negative electrodes of the resistance brazer are placed astride the wire in contact with the post mounting surface. Current flow between the electrodes melts the contact surface area beneath the wire. The melted post material acts as a braze filler metal to fillet the wire and form a joint; after which the electrodes are removed. The process is repeated for the opposite end of the wire post connection.

This type brazing process has a number of disadvantages. Since the resistance braze requires good electrical contact to the post surface, impurities on the contact surface affect the degree of melting. In some cases this may lead to a "cold braze" which, in addition to providing a poor wire-to-post mechanical bond, provides a poor electrical connection. This affects thermal conductivity to the post.

In addition, the contact pressure occurring with placement of the brazer electrodes on the post create bending of the post. When the brazer is removed the post springs back. The spring back may deform the wire. If the wire is attached at one end, spring back of the second end may place the wire in tension, resulting in wire breakage. In either case the wire position relative to the jet centerline may be altered. Since balanced positioning of the wires require geometric position accuracies of 0.0005 inches, or better, this alone provides major performance degradation.

Another disadvantage of the resistance brazing process is that it requires the post to be of a relatively high resistivity material which significantly restricts post material choices. Substantial performance improvements can be realized if greater latitude in post material selection is available.

DISCLOSURE OF INVENTION

One object of the present invention is to provide a method for noncontact brazing of small diameter metal wires to larger diameter metal surfaces. Another object of the present invention is to provide an improved method for fabricating angular rate sensors.

According to the present invention, a method for bonding metal wires having a small wire diameter to a metal surface having a surface diameter larger than the wire diameter, includes the steps of: positioning the wire in lapped relationship to the approximate center of the post mounting surface, generating two high energy beams having equal spot diameters incident at target areas of the mounting surface on opposite sides of the wire, the target areas being separated at a distance greater than the wire diameter, applying the beams simultaneously to the two target areas so as to melt the wire-to-post contact surface area without direct heating of the wire, to form a molten metal meniscus between the surface and the wire, and removing the beams simultaneously, thereby allowing the meniscus to cool to form a metal bond. In further accord with the present invention, the high energy beams are laser beams separated on the surface by a minimum distance sufficient to prevent overlapping.

With the present method the fine sensor wire is not heated directly by the high energy laser beam. By selectively spacing the beams on either side of the wire, the proper level of heat penetration ("laser footprint") beneath the wire can be achieved. The spacing between the beams is nominally 1.0 to 1.5 times the beam diameter. The actual spacing is determined by experiment to achieve the best possible weld without melting the wire.

The melt bonding of the wire to the post is provided without direct heating of the wire, by melting the receiving surface on the posts until molten, and allowing the molten post material to wet the wire. The wetting of the wire forms a molten meniscus around the wire bottom and sides, while leaving the top surface of the wire clear. This ensures both a strong mechanical bond and excellent electrical contact between wire and post, without stiffening or distorting the wire.

These and other objects, features, and advantages of the present invention will become more apparent in light of the following detailed description of a preferred embodiment thereof, as illustrated in the accompanying Drawing.

BEST MODE FOR CARRYING OUT THE INVENTION

Figure 2:
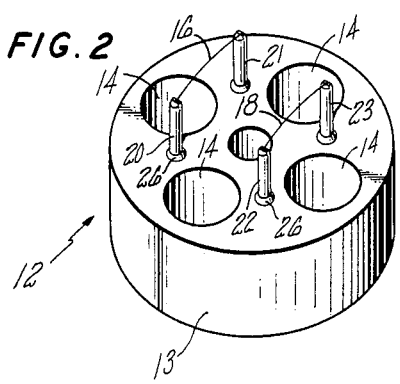
FIG. 2 is a perspective illustration of an ARS sensor plug assembly which may be fabricated using the present invention.

FIG. 2 is a perspective illustration of a sensor plug assembly 12 of the type used in the ARS described in the hereinbefore referenced U.S. Pat. No. 4,020,700. The plug assembly includes a cylindrical plug 13, typically made of KOVAR with a diameter on the order of 0.36 inches (0.9 cm). The plug includes exhaust ports 14 which allow the sensor jet stream to flow through the assembly during ARS operation. The resistance wires 16, 18 are bonded on opposite ends to mounting posts 20, 21 and 22, 23. The mounting posts are rigidly secured in glass feed-through insulators 26 in the sensor plug assembly. As stated before, the wires are typically tungsten and the post material is KOVAR.

Figure 3:
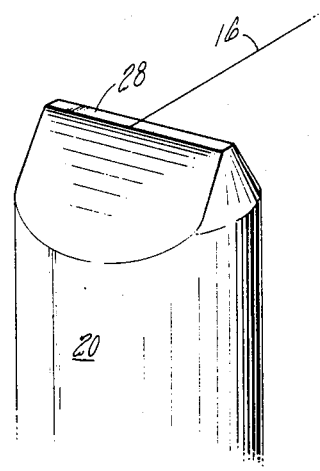
FIG. 3 is a perspective illustration of a wire-to-post mounting geometry, as used in the description of the present invention.

FIG. 3 is a perspective, magnified view of the resistance wire (e.g. wire 16) in electrical contact with the mounting surface 28 of the mounting post 20. The mounting surface is a plateau formed on the chiseled top end of the post. The chisel post end is typical, and provides a clean, flat mounting surface (28) for receiving the wire. The mounting post diameter is approximately 100× times the wire. A typical wire diameter is on the order of 0.0002 inches (0.00051 cm) and the post diameter is on the order of 0.020 inches (0.051 cm).

The relatively large thermal mass of the mounting post requires appreciable heating before reaching a molten state. KOVAR has a melting point on the order of 2700° F., and tungsten has a melting point of 6200° F. KOVAR has high strength per unit volume, however, it also has a higher resistivity which is required for the resistance brazing process. In the present invention, other post materials may be used, as necessary, for performance or manufacturing improvements. The only restriction is that the post material melting point be below that of tungsten.

Figure 1:
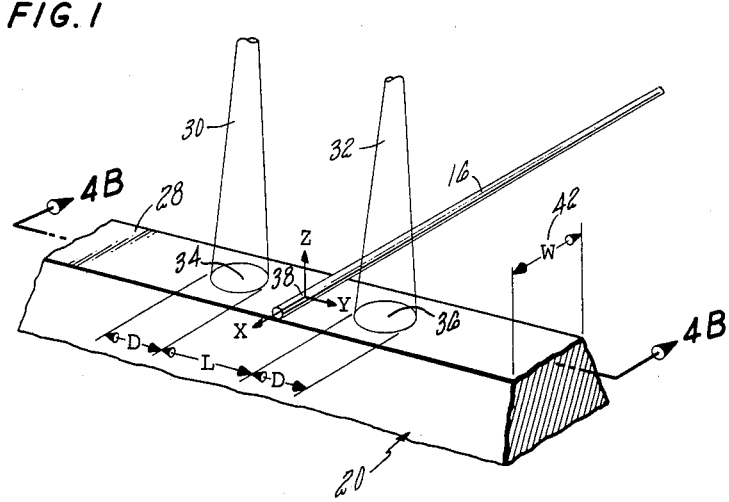
FIG. 1 is a perspective illustration, partly broken away, illustrating a key feature of the present melt bonding process.

FIG. 1 is a perspective illustration of the post mounting surface 28 immediately adjacent the wire (16) to post (20) contact area. As described hereinafter with respect to FIGS. 4, 5, the present method provides melt bonding of the wire 16 to the post major surface using two high energy beams 30, 32. The beams are directed at target areas 34, 36 located on the mounting surface, on opposite sides of the wire. The beams are focused at incidence to the X, Y plane 38 of the wire (i.e. the surface 28) to equal spot diameters (D). The beam spot edges closest to the wire are spaced apart at a distance L, which is adjustable from a minimum of on wire diameter (e.g. 0.0002 inches) up to 0.0025 inches.

The beam spot diameters themselves may range from 0.0015 inches (0.0038 cm) to 0.0025 inches (0.0064 cm), with a nominal diameter of 0.002 inches (0.0051 cm) or 10× wire diameters. The actual values of both D and L are selected in dependence on the total energy required to melt the wire-to-post contact area, without melting the wire itself. This in turn depends on the post material, the width (W) 42 of the mounting surface 28, the laser pulse width, and the pulse peak power. The incident beam spot centers are nominally at the center of the mounting surface width (W). For a post diameter of 0.020 inches the nominal width W=0.0025±0.0005 inches.

Figure 4:
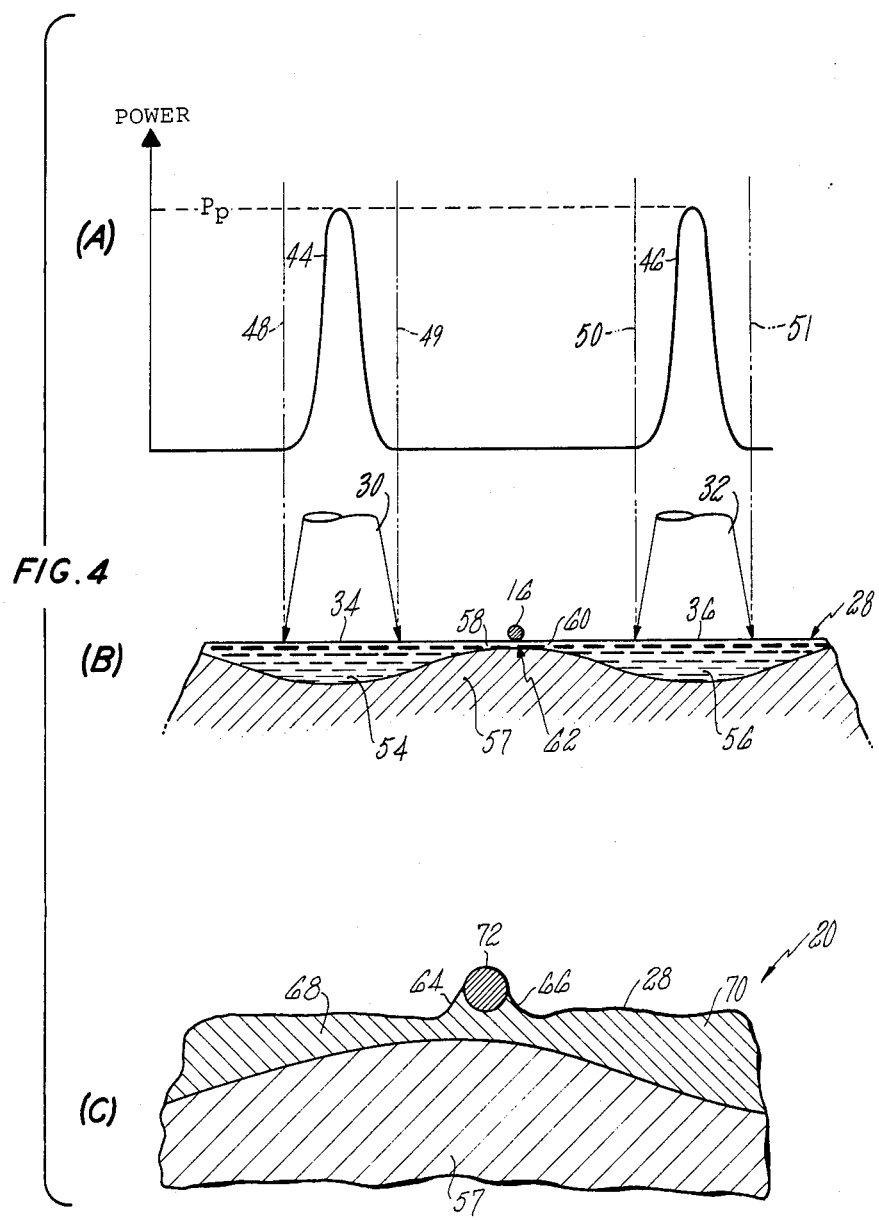
FIG. 4A is an illustration of an energy profile for the dual beam laser used in FIG. 1.
FIG. 4B is associated with 4A and illustrates a section taken along the line 4B—4B of FIG. 1.
FIG. 4C is an illustration of the sectioned view of FIG. 4B following completion of the present method.

FIG. 4, illustration (B) is a sectioned illustration taken along the lines 4B—4B of FIG. 1. The high energy beams 30, 32, which preferably are laser beams, are shown incident at target areas 34, 36. FIG. 4, illustration (A), is a sample profile of the beam power distributions 44, 46, shown in relation to spot diameter (phantom lines 48–51). The power distribution is gaussian.

In operation, the heating of the target areas creates post material melt puddles 54, 56. The molten material forms puddles in the target area vicinity which penetrates to a greatest depth directly beneath the beam. As shown, the melt puddle depth is more or less gaussian in distribution. The extremities 58, 60 of the melt puddles join at the wire-to-surface contact point 62. The molten material wets the wire end, forming the meniscus 64, 66, as shown in FIG. 4(C). FIG. 4(C) shows the hardened melt areas 68, 70 of the molten puddles 54, 56, with the completed wire bond.

Ideally, the degree of surface material melting is controlled to allow only a meniscus coating of molten material on the bottom and sides of the wire. The top 72 of the wire should remain uncoated to preserve the wire's characteristic flexure. Too much melting causes "wicking" of the wire by the melted material. This results in some degree of stiffening, and possibly deformation of the wire. Both are unacceptable.

Figure 5:
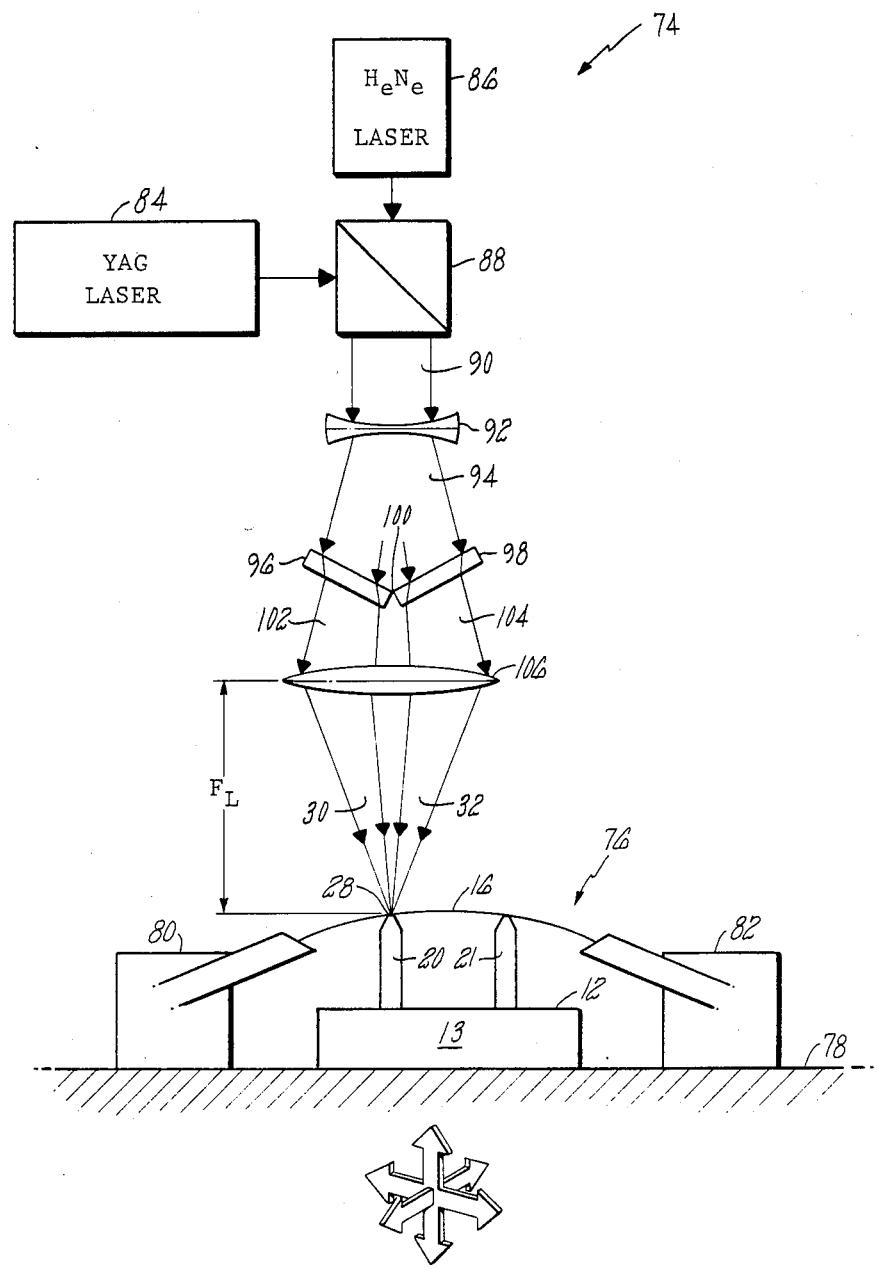
FIG. 5 is a schematic illustration of apparatus capable of performing the invention.

FIG. 5 is a schematic illustration of the present melt bonding apparatus 74. A sensor plug assembly 12 (FIG. 2) is placed in a fixture 76, and positioned on the fixture base 78 to provide registration of the plug assembly mounting posts (e.g. 20, 21) with resistance sensor wire (e.g. 16) positioned in the workpiece by wire-guide apparatus 80, 82 associated with the fixture.

The apparatus includes a neodymium YAG (yittriam-aluminum-garnett) brazing laser 84. A helium-neon (HeNe) targeting laser 86 may also be included for use as a target for the laser optics in focusing the two beams (30, 32) in the target areas 34, 36. Of course other target methods or apparatus may be used, as known to those skilled in the art. The YAG and HeNe laser outputs are both coupled through fold-down mirror 88, providing a mirror output beam 90 to the laser optics. The mirror is transparent to the HeNe laser.

The mirror output beam 90 is presented to a concave lens 92 which provides a spread beam pattern 94. The spread beam is presented to individual glass panels 96, 98, which are tightly joined along an inside edge 100 of each, so as to prevent laser light leakage and to ensure propagation through the panels. The panels, which may be plate glass, divide the beam 94 into dual beams 102, 104 which are presented to an objective lens 106. The objective lens focuses the beams 102, 104 to provide the dual beams 30, 32 (FIG. 1) at the pin mounting surface 28 (FIGS. 1, 3). The mounting surface is located at the lens focal length ($F_1$); typically six inches.

The objective lens 106 focuses the dual beams 30, 32 relative to the spatial position of the sensor wire (16) in the guides 80, 82. The beams are focused in the wire X-Y plane (38, FIG. 3) to provide the two beam spots in target areas 34, 36 (FIG. 1) on the post mounting surface. All beam adjustments are made relative to the position of the wire fixed by the wire guides 80, 82. The plug assembly is positioned in the fixture 76. The fixture provides four designated stops (not shown) corresponding to the coordinate position of each of the post mounting surfaces beneath the wire positioned in the guide. The first coordinate position is selected and the fixture is raised upward until the post mounting surfaces are in contact with the wire, providing sufficient positive pressure to hold the wire in place on the post surfaces. The YAG laser is pulsed for a pulse duration sufficient to provide melting of the surface and formation of the meniscus at the wire-to-surface contact area. The pulse is removed, the mounting surface cooled, and the fixture (with wire guide attached) is positioned to the next coordinate position at the opposite end of the wire to provide registration of the next post 21 at the X-Y plane of the focused beam, and a second weld is made. The wire ends are then cut off, the fixture is moved in a direction perpendicular to the wire by the amount of the wire spacing and the second wire is attached to two posts in the same manner.

The fixture 76 is representative of apparatus suitable for positioning the wire to the post mounting surface. Various other types of similar apparatus may be used. The following parameters were established for one specie of mounting combination. For bonding a 0.0002 inch diameter tungsten wire to a 0.020 inch diameter KOVAR post having a chisel mounting surface width of 0.0025 (±0.0005 inches), the laser pulse width was five milliseconds with an average beam peak power (Pp) of approximately ten microwatts and a total beam energy of 40 milli joules average.

The melt bonding method of the present invention provides repeatable high quality bonds of the resistance wires to the sensor plug mounting posts. The method is noncontact so that there is no deformation of the mounting post and no dislocation of the wire with respect to the mounting surface, ensuring compliance to the 0.0005 inch wire position tolerance. The dual beams are sufficiently spaced apart so as to provide heating only of the target areas on the pin mounting surface.

Although the invention has been shown and described with respect to a best mode embodiment thereof, it should be understood by those skilled in the art that various other changes, omissions, and additions in the form and detail thereof, may be made therein without departing from the spirit and scope of the invention.

We claim:

1. The method of bonding a wire having upper and lower surfaces and having a first diameter value, in lap relationship to a mounting surface having a second diameter value larger than the first diameter value, comprising the steps of:
   selecting the wire from a first metal and selecting the mounting surface from a second metal;
   positioning the lower surface of the wire in a contact area of the mounting surface;
   applying first and second high energy beams simultaneously to first and second target areas located on the mounting surface on opposite sides of, and separate from, said contact area, said first and second beams each having beam spot diameters less than the second diameter at the point of incidence of said beams to said first and second target areas;
   maintaining said high energy beams incident to said first and second target areas for a time necessary to melt the second metal of said contact area sufficient to wet the first metal of the wire therewith to form a metallurgical bond therebetween; and
   removing said beams simultaneously from said target areas.

2. The method of claim 1, wherein said first and second target areas are each spaced at a minimum distance from said opposite sides of said contact area.

3. The method of claim 1, wherein said step of maintaining includes the step of melting the metal material in said contact area for a time sufficient to wet the first metal of said lower surface of the wire with a meniscus of the second metal of the mounting surface on each said opposite side of said contact area.

4. The method of claim 1, wherein said high energy beams are laser beams.

5. The method of claim 1, wherein said first and second beams have substantially equal beam spot diameters at incidence to said first and second target areas.

6. The method of claim 1, wherein said first metal has a melting point temperature higher than the melting point temperature of said second metal.

7. The method of claim 1, wherein said first metal is tungsten and said second metal is KOVAR.

8. The method of claim 2, wherein said minimum distance is not less than said first diameter value.

9. The method of claim 6, wherein the melting point temperature of said first metal is at least twice the melting point temperature of said second metal.

10. An angular rate sensor, comprising:
    a sealed, fluid filled casing for housing a nozzle block assembly having a jet chamber disposed therein, and for housing a jet pump assembly connected for response to an external source of AC signals and supported in registration with said jet chamber by an anvil support means adapted to engage said casing internally, said jet chamber including a nozzle and a sensor plug assembly disposed at opposite ends thereof, said sensor plug assembly having resistance wire sensing elements metallurgically bonded to mounting posts disposed on said plug assembly, said resistance wires being cooled differentially in dependence on the angular rotation of the sensor, by a fluid jet formed by fluid force under pressure through said nozzle by said jet pump assembly,
    as characterized by:

said resistance wires comprising a first metal and said mounting posts comprising a second metal, said resistance wires being connected by metallurgical bond on each end thereof to a contact area of a mounting surface on each said post by simultaneously applying two high energy beams to two target areas on the mounting surface on opposite sides of said contact area and separate therefrom, for a time necessary to melt the second metal of said contact area sufficient to wet the first metal of the wire to form said metallurgical bond.

11. The angular rate sensor of claim 10, wherein said high energy beams comprise laser beams.

* * * * *